US006654563B1

United States Patent
Darcie et al.

(10) Patent No.: US 6,654,563 B1
(45) Date of Patent: Nov. 25, 2003

(54) FIBER/WIRED COMMUNICATION SYSTEM

(75) Inventors: Thomas Edward Darcie, Fairhaven, NJ (US); Bhavesh N. Desai, Livingston, NJ (US); Alan H. Gnauck, Middletown, NJ (US); Xiaolin Lu, Middletown, NJ (US); Sheryl Leigh Woodward, Holmdel, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/460,770

(22) Filed: Dec. 14, 1999

Related U.S. Application Data
(60) Provisional application No. 60/120,373, filed on Feb. 17, 1999.

(51) Int. Cl.[7] .................................................. H04J 14/08
(52) U.S. Cl. ............................ 398/98; 398/79; 398/70; 398/71; 398/74; 398/75; 398/82; 398/91; 398/100; 398/182; 398/183; 455/5.1; 455/4.1; 455/4.2; 455/3.1; 370/421; 370/422; 370/424; 370/425; 370/460
(58) Field of Search ............................. 398/79, 91, 98, 398/82, 100, 182, 183, 74, 75, 70, 71; 455/5.1, 3.1, 4.1, 4.2; 370/421, 422, 424, 425, 460

(56) References Cited

U.S. PATENT DOCUMENTS

| | | | | |
|---|---|---|---|---|
| 4,441,180 A | * | 4/1984 | Schussler | 370/3 |
| 5,202,780 A | | 4/1993 | Fussganger | |
| 5,521,734 A | * | 5/1996 | Frigo | 359/152 |
| 5,642,155 A | | 6/1997 | Cheng | |
| 5,864,415 A | | 1/1999 | Williams et al. | |
| 5,864,672 A | * | 1/1999 | Bodeep et al. | 348/6 |
| 5,864,748 A | | 1/1999 | Dail | |
| 5,880,865 A | | 3/1999 | Lu et al. | |
| 5,920,410 A | * | 7/1999 | Smith et al. | 359/119 |
| 6,147,786 A | * | 11/2000 | Pan | 359/124 |
| 6,381,248 B1 | | 4/2002 | Lu | |
| 6,493,335 B1 | | 12/2002 | Darcie et al. | |

* cited by examiner

Primary Examiner—Leslie Pascal
Assistant Examiner—Hanh Phan
(74) Attorney, Agent, or Firm—Duane S. Kobayashi

(57) ABSTRACT

A communication system between head-ends and end-users is provided which expands bandwidth and reliability. A concentrator receives communication signals from a head-end and forwards the received communication signals to one or more fiber nodes and/or one or more mini-fiber nodes. The concentrator demultiplexes/splits received signals for the mini-fiber nodes and the fiber nodes and forwards demultiplexed/split signals respectively. The mini-fiber nodes may combine signals received from the head-end with loop-back signals used for local medium access control prior to forwarding the signals to the end-users. Upstream data are received by the mini-fiber nodes and/or fiber node and transmitted to the concentrator. The concentrator multiplexes/couples the mini-fiber node and the fiber node upstream signals and forwards multiplexed/coupled signals to the head-end. Communication signals received from the mini-fiber nodes that are destined to other end-users also connected to the mini-fiber nodes may be routed by the concentrator without head-end interaction.

24 Claims, 10 Drawing Sheets

FIBER/WIRED COMMUNICATION SYSTEM

BACKGROUND OF THE INVENTION

1. Field of Invention

This invention relates to a communication system that includes fiber optic and wired mediums.

2. Description of Related Art

Cable communication systems use optical fibers to transmit information between a head-end and a fiber node and use coaxial cable to transmit information between the fiber node and end-users. With increasing need for greater capacity, current systems are stressed to their limits. Thus, there is need for new technology to increase capabilities of communication between head-ends and end-users.

SUMMARY OF THE INVENTION

This invention provides a new architecture for a communication system between head-ends and end-users which expands capacity, simplifies transmission and operation, increases reliability and reduces cost of the communication system. A concentrator receives communication signals from a head-end and forwards the received communication signals to either one or more fiber nodes and one or more mini-fiber nodes. End-users communicate with the fiber nodes and mini-fiber nodes via wired connections such as coaxial lines. The connection to the head-end is via a small number of optical fibers (preferably one or two) while a much larger number of mini-fiber nodes may be serviced where a connection to each of the mini-fiber nodes is via one or more optical fibers that provide full duplex communication.

The communication between the head-end and the concentrator may be via digital signals or analog signals. Analog signals are split from the digital signals and sent to the end-users via the fiber node and digital signals are demultiplexed into signals to be transmitted to the end-users via the mini-fiber nodes and the fiber nodes. The fiber node digital signals are modulated onto RF carriers and forwarded to the fiber nodes. Mini-fiber node digital signals are further demultiplexed into signals corresponding to each of the mini-fiber nodes and transmitted to the mini-fiber nodes via respective optical fibers. The mini-fiber nodes may combine the signals received from the head-end with loop-back signals used for local medium access control (MAC) and forward the combined signals to the end-users by inserting those signals into the transmissions from the fiber node.

Upstream digital signals are received by the mini-fiber nodes, demodulated and transmitted to the concentrator. The concentrator multiplexes the upstream mini-fiber node signals using multiplexing techniques such as time domain multiplexing (TDM) or wavelength division multiplexing (WDM) and forwards the multiplexed signals to the head-end. Upstream digital signals may be received by the fiber node and demodulated and multiplexed together with mini-fiber node signals and forwarded to the head-end.

If the head-end communicates with the fiber node via analog communication signals, the concentrator splits the analog signals destined for the fiber nodes from digital signals that are destined for mini-fiber nodes. The analog signals may be frequency converted by shifting the received signals to the proper RF bands and transmitted to the fiber nodes while the digital signals are demultiplexed and sent to respective mini-fiber nodes. Upstream analog signals may be received from the fiber nodes and frequency shifted and multiplexed with upstream mini-fiber node digital signals and sent to the head-end.

The concentrator also receives communication signals from end-users through the mini-fiber nodes that may be destined to other end-users also connected to the mini-fiber nodes. In this situation, the concentrator may include a router that routes the communication signals among mini-fiber nodes without forwarding the information to the head-end. In this way, communication traffic between the concentrator and the head-end is reduced with corresponding increase in efficiency.

Reliability is increased because the concentrator reduces the number of optical fibers required to be connected to the head-end. This shortens the mean-time-to-repair (MTTR) and also reduces cost of the communication system.

BRIEF DESCRIPTION OF THE DRAWINGS

The invention is described in detail with reference to the following figures wherein like numerals reference like elements, and wherein.

DETAILED DESCRIPTION OF PREFERRED EMBODIMENTS

Figure 1:
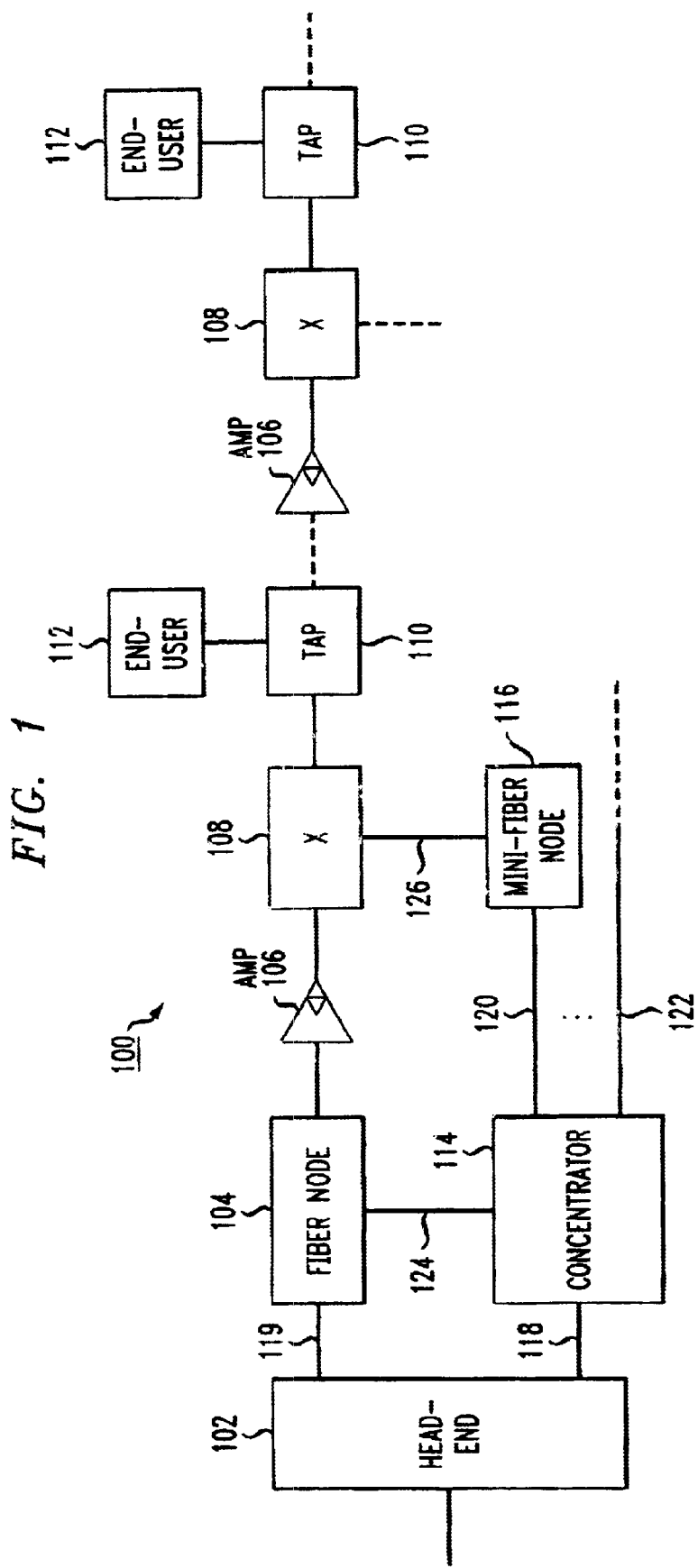
FIG. 1 shows an exemplary block diagram of a communication system between a head-end and end-users.

FIG. 1 shows an exemplary block diagram of a communication system 100 between a head-end 102 and end-users 112. A first downstream signal such as broadcast information is transmitted from the head-end 102 to a fiber node 104. The fiber node 104 forwards the broadcast information to the end-users 112 via amplifiers 106 and taps 110.

The end-users 112 may communicate with the head-end via an upstream channel through the taps 110, the amplifiers 106 (upstream indicated by the smaller triangle within the larger triangle) and the fiber node 104.

Analog communication signals between the head-end and the fiber node 104 are transmitted via an optical fiber(s) 119.

The communication signals may include first downstream traditional cable television broadcast signals, for example. First upstream signals from the end-users 112 may be transmitted to the head-end via a band different than a band for the first downstream broadcast signals.

Figure 2:
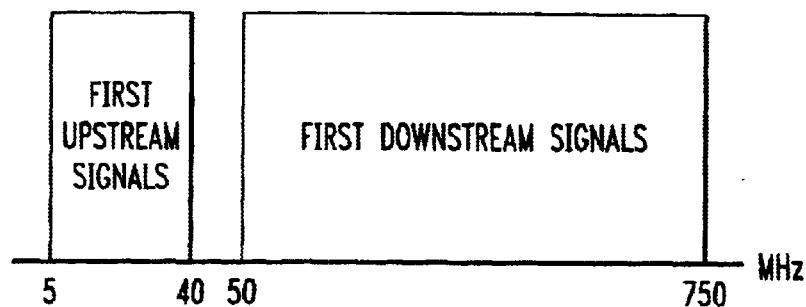
FIG. 2 shows a band allocation for a fiber node shown in FIG. 1.

FIG. 2 shows an exemplary band allocation for the analog communication signals between the end-users 112 and the fiber node 104. The first downstream signals usually may be transmitted between 50–750 MHz while the first upstream signals may be transmitted between 5–40 MHz.

Digital communication between the head-end 102 and the end-users 112 may be transmitted as second downstream signals via optical fiber(s) 118 through the concentrator 114 and mini-fiber nodes (mFNs) 116. The optical fiber 118 may include one or more fibers. If two fibers are included, then one fiber maybe dedicated for upstream communication and the other fiber may be dedicated for downstream communication. Any number of fibers may used together with dense wavelength division multiplexing (DWDM) forming any number of channels to obtain half duplex or full duplex communication. The concentrator may also receive second broadcast signals (analog or digital) from the head-end 102 and transmit the second broadcast signals to the fiber node 104 for transmission to the end-users via the amplifiers 106 and the taps 110. The first upstream signals (in analog or digital) received from the end-users 112 via the fiber node 104 and/or second upstream signals received from the mFNs 116 may also be forwarded to the head-end via the concentrator 114 and the fiber 118.

The above-described communication system provides for added efficiency via the concentrator 114. Instead of connecting each of the mFNs 116 directly to the head-end 102 via one or more fibers, many mFNs 116 are connected to the concentrator 114 via fibers 120–122. The concentrator 114 multiplexes the communication signals from all the mFNs 116 using techniques such as time division multiplexing and outputs the multiplexed signal to the head-end 102 via the fiber 118. Thus, the concentrator 114 reduces the number of fibers that is needed to extend communication signals between the mFNs 116 and the head-end 102.

In addition to the above, the concentrator 114 may also perform routing functions among communication signals received from all the mFNs 116. For example, if a communication signal received from a first mFN 116 is destined for an end-user 112 that may be reached via a second mFNs 116 also connected to the concentrator 114 (The first and second mFNs 116 may be the same mFN 116.), the concentrator 114 routes the communication signal directly to the destination end-user 112 without forwarding the communication signal to the head-end 102. In this way, the communication load of the head-end 102 is reduced.

Figure 3:
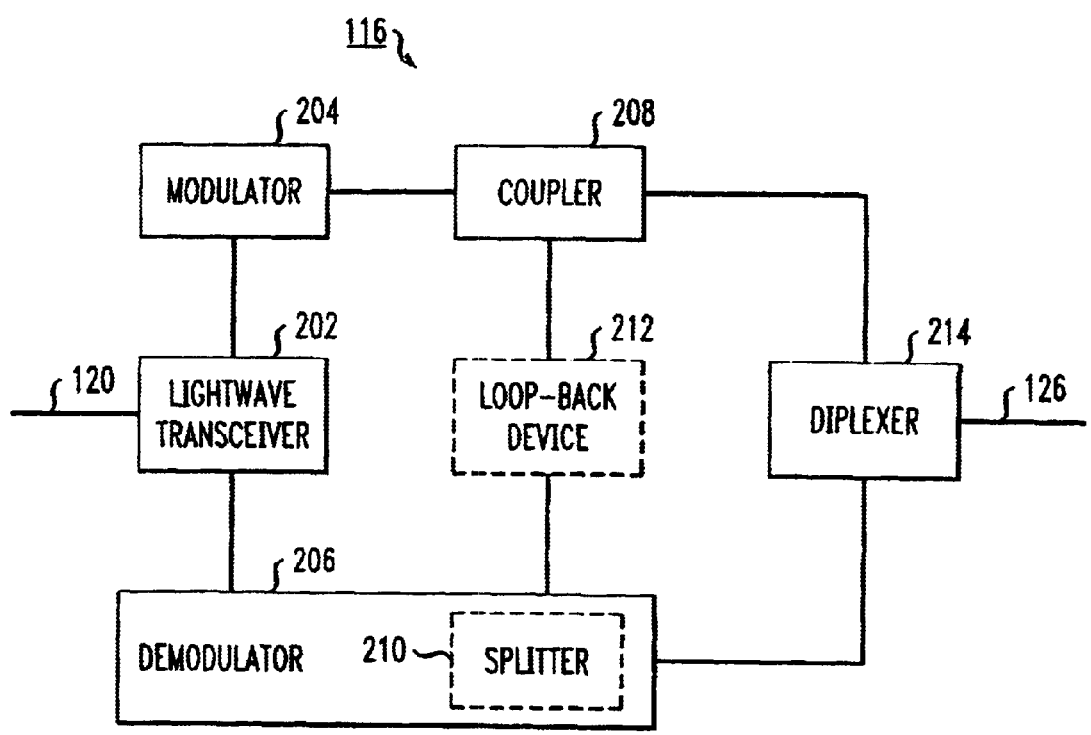
FIG. 3 shows an exemplary block diagram of a mini-fiber node.

FIG. 3 shows an exemplary block diagram of a mFN 116 which includes a light wave transceiver 202, a modulator 204, a coupler 208, a diplexer 214, and a demodulator 206. Communication signals are received and transmitted to and from the concentrator 114 via a single fiber 120, for example, and the light wave transceiver 202. The optical fiber 120 may support a full duplex communication at ten megabits per second (MBPS) by using coarse wavelength division multiplexing (WDM), for example. The light wave transceiver 202 outputs received communication signals to the modulator 204 to convert the digital base band optical signals into radio frequency (RF) signals at appropriate frequencies. Digital base band signals are 1s and 0s transmitted directly over the fiber, for example. These digital base band signals may be received by the modulator and modulated onto the appropriate RF bands for further transmission.

The modulator 204 outputs modulated signals to a coupler 208 which combines the modulator output signals together with an optional loop-back signal generated by an optional loop-back device 212 (shown as a dashed box). The output of the coupler 208 is input to the diplexer 214 which outputs the signals received from the coupler 208 to an inserter 108 via a connection 126. The inserter 108 combines the output of the mFN 116 received from the connection 126 with the output of the amplifier 106 for output to downstream taps 110 and end-users 112.

The second upstream communication signals to the mFNs 116 are also received via the connection 126 and the diplexer 214. The diplexer 214 directs the received second upstream communication signals (which are RF signals) to the demodulator which demodulates the second upstream RF communication signals to digital base band signals and outputs the demodulated signals to the light wave transceiver 202 for output to the head-end 102 via the optical fiber 120.

The mFN 116 may support either local or centralized medium access control. If centralized medium access control is implemented, upstream medium access requests are forwarded to the head-end 102 or the concentrator 114 via the demodulator 206 and the light wave transceiver 202. For this case, the loop-back device 212 may not be required. If local medium access is implemented, local access signals may be out-of-band and thus are not modulated together with other communication signals. For this case, the local access signals may be split up by an optional splitter 210 (shown as a dashed box) and forwarded to the loop-back device 212. The loop-back device 212 then performs any local access contention/control functions that may be desired and forwards loop-back signals to the coupler 208 to be combined with the signals received from the head-end 102 and returned to the end-users 112 via the diplexer 214 and the inserter 108.

If the local access signals are modulated together with other communication signals, the signals received from the diplexer 214 are first demodulated by the demodulator 206 and the local medium access signals are separated out and sent to the loop-back device 212 for the loop-back signals (out-of-band or in-band signals) based on any medium access scheme. For this case, the splitter 210 may not be required. The generated loop-back signals are returned to the end-users via the coupler 208 and diplexer 214.

Figure 4:
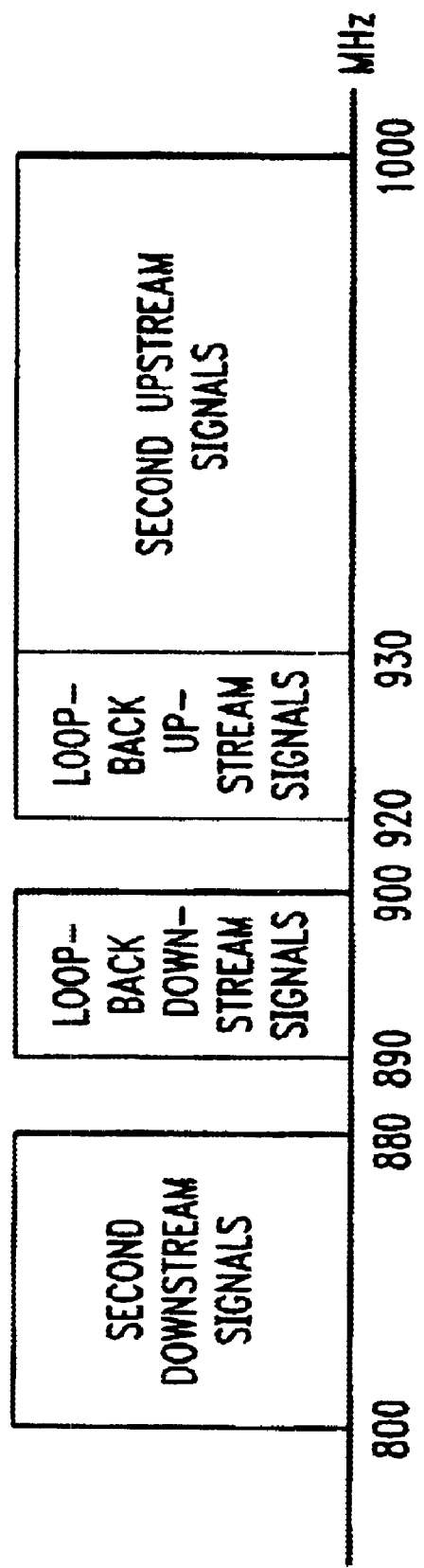
FIG. 4 shows a band allocation related to the mini-fiber node.

FIG. 4 shows an exemplary band allocation for the mFN 116. The second downstream communication signals may be transmitted within a band between 800 and 880 MHz while the second upstream signals may be transmitted between 930 and 1000 MHz. The loop-back upstream and downstream signal may be transmitted in the bands 920–930 MHz and 890–900 MHz, respectively. As indicated above, the loop-back upstream signal may be modulated together with the second upstream signals so that the second upstream band may range between 920 and 1000 MHz.

Figure 5:
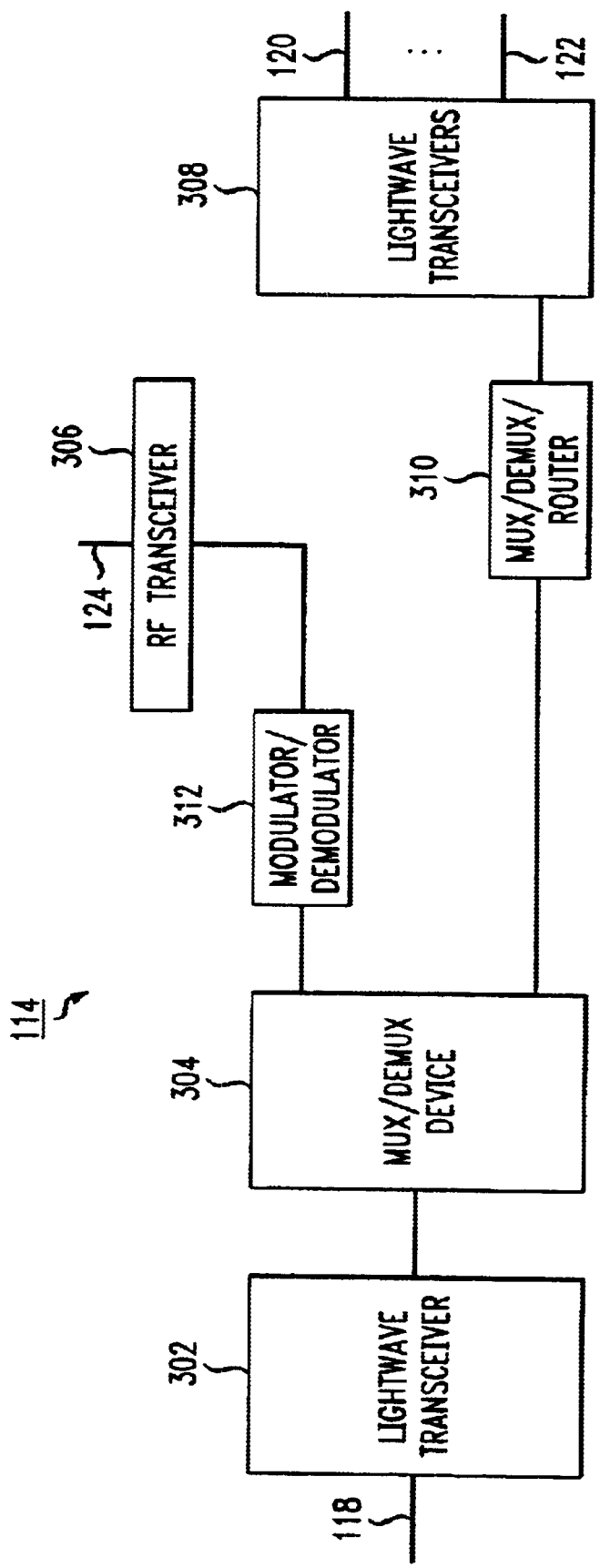
FIG. 5 shows an exemplary block diagram of a concentrator for digital communication between the concentrator and the head-end.

FIG. 5 shows an exemplary block diagram of the concentrator 114 that supports digital transmission over the fiber 118. The fiber connections 120 and 122 support communications between the concentrator 114 and the mFNs 116. For downstream communication, the head-end 102 transmitted communication signals are received by the light wave transceiver 302 and forwarded to a mux/demux device 304. The mux/demux device 304 separates out communication signals destined to mFNs 116 and forwards those signals to the mux/demux/router 310 while the remaining signals are sent to the modulator/demodulator 312. The mux/demux/router 310 breaks out the communication signals for each of the respective mFNs 116 and transmits those signals to the mFNs 116 through the light wave transceivers 308 via the optical fibers 120–122.

The modulator/demodulator 312 receives the communication signals from the mux/demux device 304 and modulates the received signals onto RF carriers and transmits the modulated signals to the RF transceiver 306 for transmission to the fiber node 104 via a wire connection 124 such as a coaxial line. The signals sent to the fiber node 104 may be narrowcast signals received from the head-end 102. For example, such narrowcast signals may be local television signals destined to end-user subscribers associated with the fiber node 104.

Upstream RF signals may be received from end-users 112 serviced by the fiber node 104. These signals are received by the RF transceiver 306 and demodulated by the modulator/demodulator 312 into digital base band signals which are forwarded to the mux/demux device 304. The mux/demux 304 combines the signals received from the modulator/demodulator 312 and the mux/demux/router device 310 via a multiplexing technique such as time domain multiplexing (TDM), for example, and sends the signals to the light wave transceiver 302. The light wave transceiver 302 may transmit the signals to the head-end 102 via the optical fiber 118 using techniques such as dense wave length division multiplexing (DWDM), for example.

Figure 6:
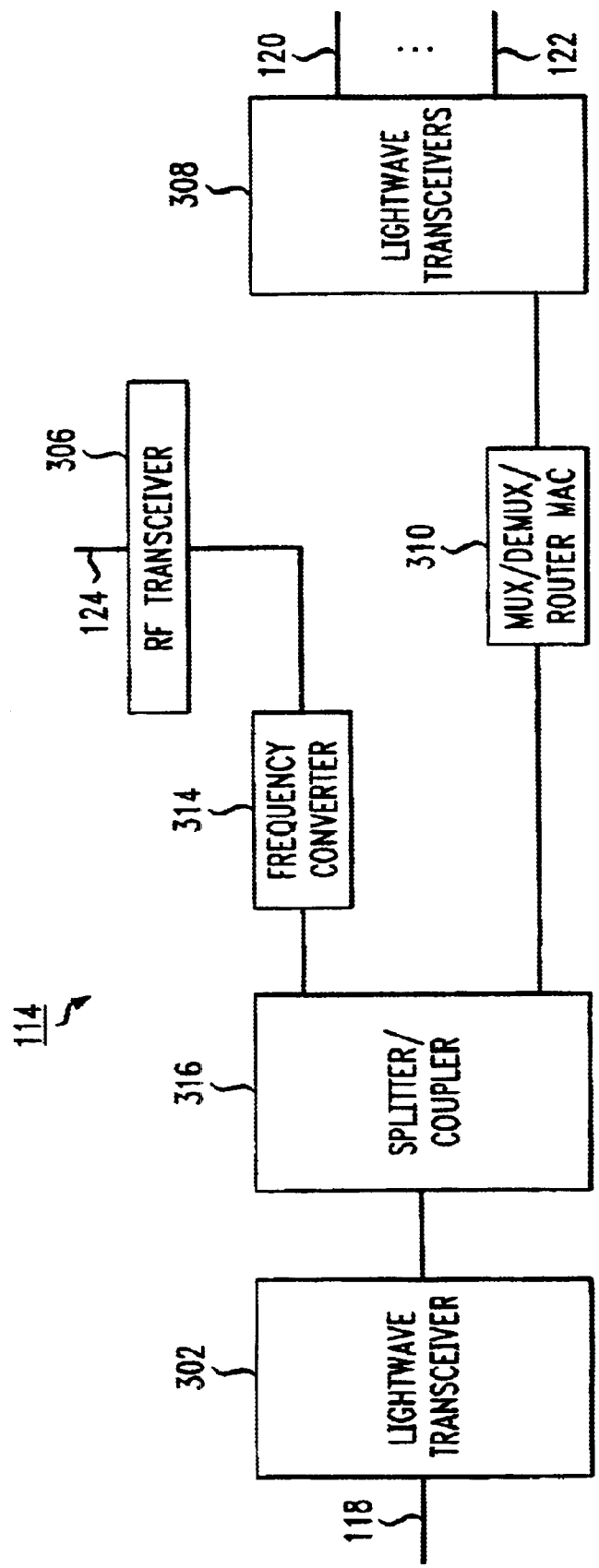
FIG. 6 shows an exemplary block diagram of a concentrator for digital and analog communication between the concentrator and the head-end.

The concentrator 114 may also transmit analog RF signals through the optical fiber 118. FIG. 6 shows an exemplary block diagram of a concentrator 114 that receives both analog and digital signals from the light wave transceiver 302. The received signals are separated into analog signals destined for the fiber node 104 and digital signals destined for the mFNs 116 via a splitter/coupler 316. The analog signals are split by the splitter/coupler 316 and sent to a frequency converter 314. The frequency converter 314 may shift the RF frequency received from the head-end 102 to an appropriate RF band and transmits the signals to the RF transceiver 306 for transmitting to the fiber node 104 via the wired interface 124. The splitter/coupler 316 sends the digital signals to the mux/demux/router 310 for transmission to the mFNs 116.

Figure 7:
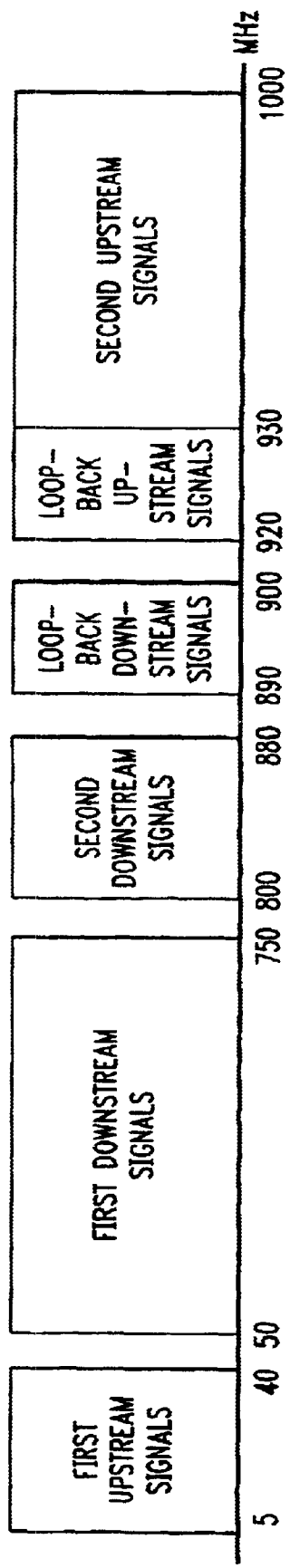
FIG. 7 shows an exemplary band allocation for the system.

FIG. 7 shows a complete frequency band diagram of the communication signals at the tap 110. As discussed earlier, the first upstream signals from the fiber node 104 extend from 5 to 40 MHz. The fiber node 104 receives the first downstream signals directly from the head-end 102 and this band extends from 50 to 750 MHz. The second downstream signals transmitted to the mFNs 116 extends from 800 to 880 MHz and the second upstream signals extend from 930 to 1000 MHz. The loop-back downstream signals extend from 890 to 900 MHz and the loop-back upstream signals extend from 920 to 930 MHz. The above bands are provided as an example only and may be changed as implementation requires.

Figure 8:
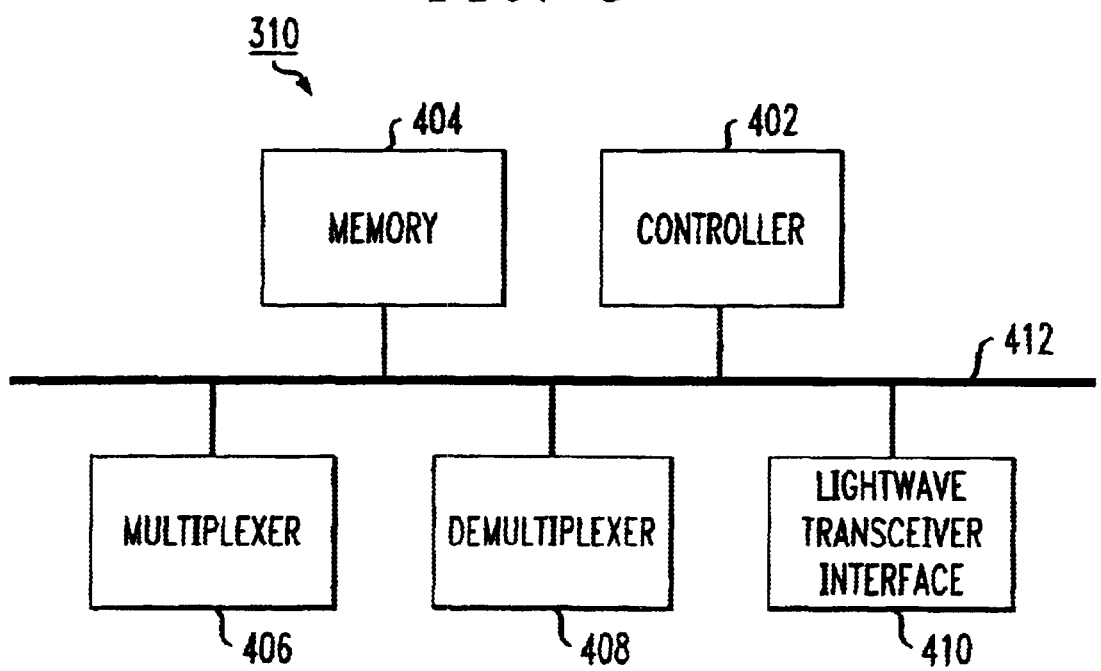
FIG. 8 shows an exemplary block diagram of a mux/demux/router of the concentrator.

FIG. 8 shows an exemplary block diagram of the mux/demux/router 310. The mux/demux/router 310 may include a controller 402, a memory 404, a multiplexer 406, a demultiplexer 408 and a lightwave transceiver interface 410. The above components are coupled together via a signal bus 412. While the above illustrates the mux/demux/router 310 via a specific bus orientated architecture, other type architectures and implementations may be used as are well known to one of ordinary skill in the art.

Communication signals are received from the head-end 102 in the demultiplexer 408 via either the mux/demux device 304 or the splitter/coupler 316. The communication signals are demultiplexed and sent to the controller 402. The controller 402 examines the communication signals for forwarding to the mFNs 116 connected to destined end-users 112. For example, if the communication signals are in the form of data packets, the controller 402 examines headers of the data packets to determine the destination addresses and based on addressing information stored in the memory 404, for example, determines which of the mFNs 116 should be used to transmit the data packets to the destined end-users 112. The controller 402 outputs the data packet to the appropriate mFNs 116 via the lightwave transceiver interface 410.

When communication signals are received from the mFNs 116 via the lightwave transreceiver interface 410, the controller 402 receives the signals and examines the communication signals to determine the destination of the communication signals. For example, if the communication signals are data packets, the controller 402 examines the header of the data packets and determines whether the data packets are destined to end-users 112 reachable through one of the mFNs 116 that is connected to the lightwave transceivers 308. If reachable, the controller 402 directs the data packets to the proper mFNs 116 via the lightwave transceiver interface 410.

If the data packets are destined to other than the end-users 112 reachable via one of the mFNs 116, the controller 402 sends the data packets to the multiplexer 406 to multiplex the data packets for transmission to the head-end 102. The multiplexer multiplexes the data packets using TDM, for example, and forwards the multiplex signals to either the splitter/coupler 316 or the mux/demux device 304.

Figure 9:
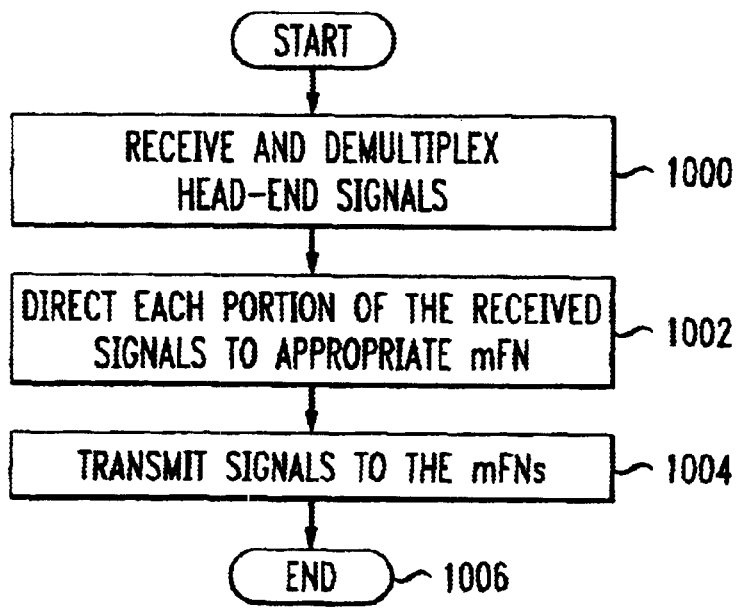
FIG. 9 shows an exemplary flow chart for a mini-fiber node downstream communication process of the mux/demux/router.

FIG. 9 shows an exemplary flowchart of a process of the mux/demux/router 310. In step 1000, the demultiplexer 408 receives head-end signals and the process goes to step 1002. In step 1002, the controller 402 directs each portion of the received signals to appropriate mFNs 116 and the process goes to step 1004. In step 1004, the received signals are transmitted to respective mFNs 116 via the lightwave transceiver interface 410 and the process ends as step 1006.

Figure 10:
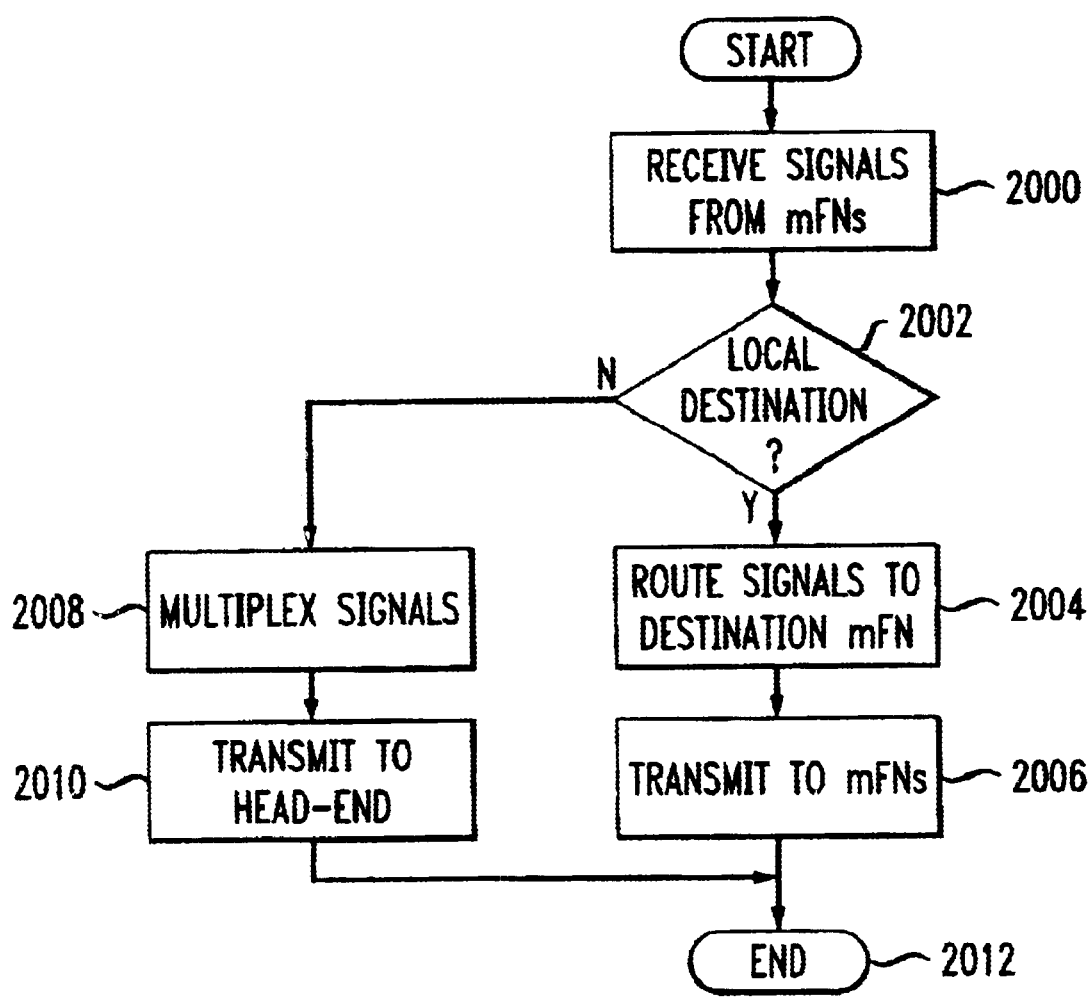
FIG. 10 shows an exemplary flow chart for a mini-fiber node upstream communication process of the mux/demux/router.

FIG. 10 shows an exemplary flow chart for a process of the mux/demux/router device 310 for signals received from the mFNs 116. In step 2000, the lightwave transceiver interface 410 receives signals from the mFNs 116 and the process goes to step 2002. In step 2002, the controller 402 determines whether the destination of the received signals are directed to any of the end-users 112 that is reachable via one of the mFNs 116 coupled to the lightwave transceiver 308. If reachable, the process goes to step 2004; otherwise, the process goes to step 2008. In step 2008, the signals are multiplexed by the multiplexer 406 and the process goes to step 2010. In step 2010, the signals are transmitted to the head-end 102 via the lightwave transceiver 302 and the process ends at step 2012.

In step 2004, the controller 402 routes the received signals to the destined end-users 112 via appropriate ones of the mFNs 116 and the process goes to step 2006. In step 2006, the signals are transmitted to the respective mFNs 116 and the process ends at step 2012.

Figure 11:
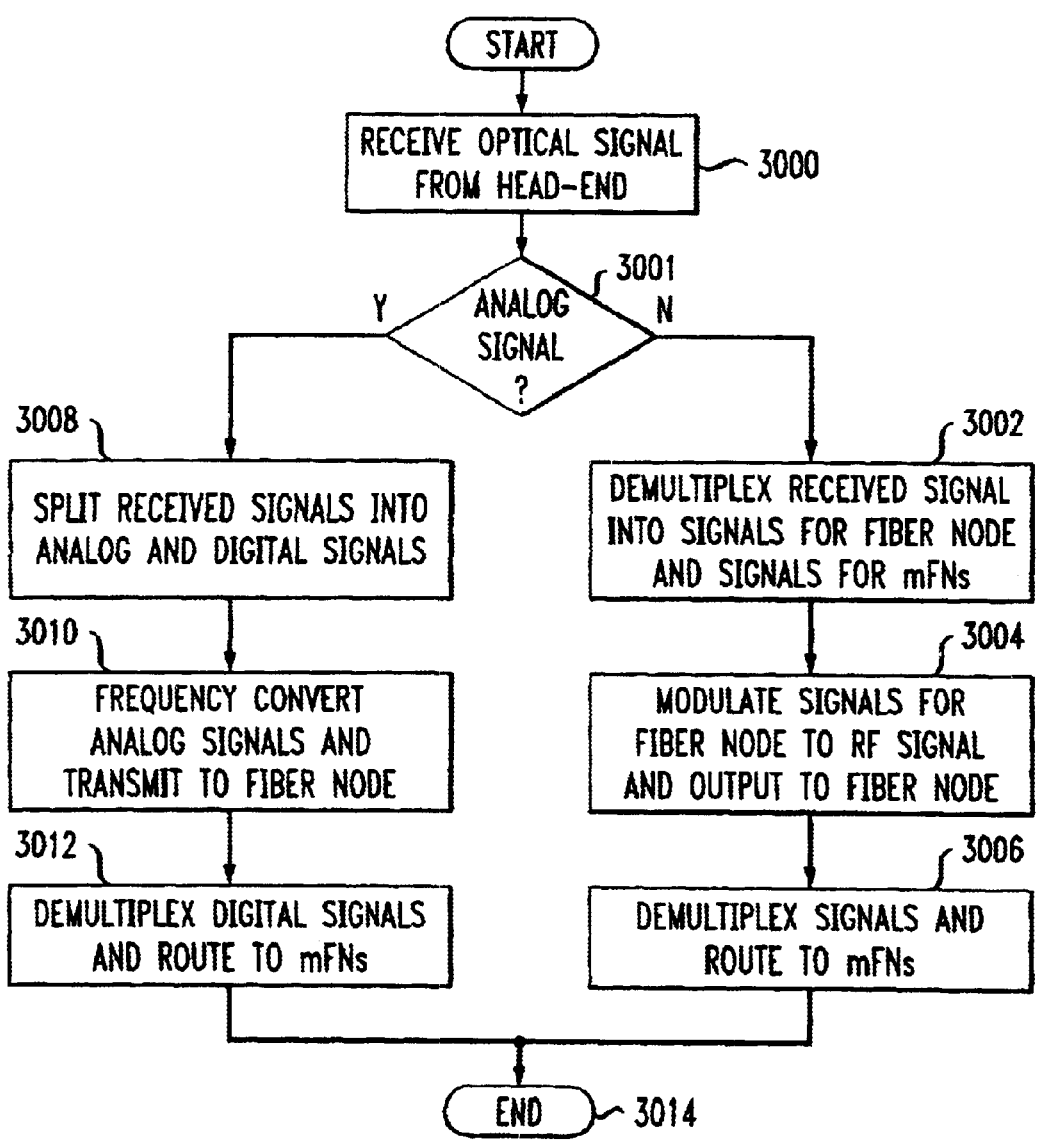
FIG. 11 shows an exemplary flow chart for a total downstream communication process of the concentrator.

FIG. 11 shows an exemplary flow chart of the concentrator 114 for receiving signals from the head-end 102. In step 3000, the lightwave transceiver 302 receives the optical signals from the head-end 102 and the process goes to step 3001. In step 3001, the process determines whether the head-end 102 has transmitted analog signals via the optical fiber 118. In actual implementations, the concentrator may be designed to handle either digital or analog signals. Thus, step 3001 may be performed by virtue of a specific design of the concentrator. If analog signals are transmitted, the process goes to step 3008; otherwise the process goes to step 3002. In step 3002, the received signal is demultiplexed into signals for the fiber node 104 and signals for the mFNs 116 and the process goes to step 3004. In step 3004, the signals destined for the fiber node 104 is modulated onto RF carriers and output to the fiber node 104 and the process goes to step 3006. In step 3006, the signals destined for the mFNs 116 are demultiplexed and routed to the mFNs 116 and the process ends at step 3014.

In step 3008, the signals received from the head-end 102 are split into analog and digital signals and the process goes to 3010. In step 3010, the analog signals are frequency converted to proper RF bands for the fiber node 104 and the converted signals are transmitted to the fiber node 104 and the process goes to step 3012. In step 3012, the digital signals are demulitplexed and routed to appropriate mFNs 116 and the process ends at step 3014.

Figure 12:
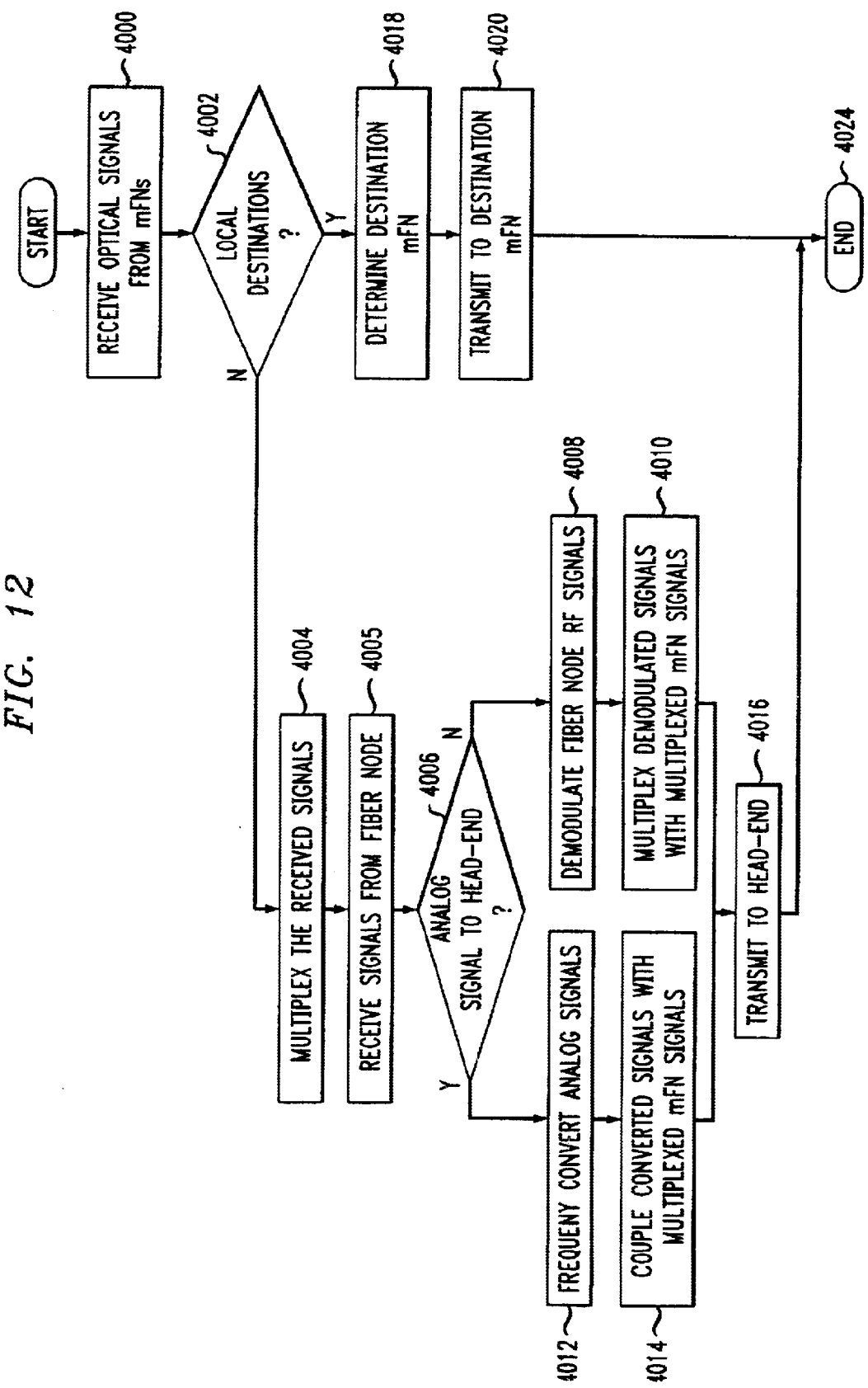
FIG. 12 shows a total upstream communication process of the concentrator.

FIG. 12 shows a flow chart for an exemplary concentrator process for receiving signals from mFNs 116 and the fiber node 104 and transmitting the received signals to the head-end 102. In step 4000, the lightwave transceivers 308 receives upstream optical signals from the mFNs 116 and the process goes to step 4002. In step 4002, the mux/demux/router 310 determines whether the data received from the mFNs 116 have local destinations. If the destinations are local, the process goes to step 4018; otherwise, the process goes to 4004.

In step 4004, the mux/demux/router 310 multiplexes the signals received from the mFNs 116 and the process goes to step 4005. In step 4005, the process receives upstream signals from the fiber node 104 and goes to step 4006. In step 4006, the process determines whether analog signals are to be transmitted to the head-end 102. If analog signals are to be transmitted, the process goes to step 4012; otherwise, the process goes to step 4008. In step 4008, the process demodulates the fiber node RF signals and goes to step 4010. In step 4010, the demodulated fiber node signals are multiplexed together with the mFN signals which are already multiplexed and the process goes to step 4016. In step 4016, the multiplexed signals are transmitted to the head-end 102 and the process ends at step 4024.

In step 4012, the process frequency converts the analog signals received from the fiber node 104 to the appropriate frequency bands for transmission to the head-end 102 and the process goes to step 4014. In step 4014, the frequency converted signals are multiplexed with the digital multiplexed signals of the mFNs 116 and the process goes to step 4016.

In step 4018, the mux/demux/router 310 determines the proper destination mFNs 116 for the received signals and goes to step 4020. In step 4020, the received signals are transmitted to the destination mFNs 116 and the process goes to step 4024 and ends.

While this invention has been described in conjunction with specific embodiments thereof, it is evident that many alternatives, modifications, and variations will be apparent to those skilled in the art. For example, while only one fiber node 104 are discussed, many fiber nodes 104 may be coupled to the concentrator 114. When multiple fiber nodes 104 are coupled, the concentrator 114 may include multiple modulator/demodulators 312 and/or multiple splitter/couplers 316. Accordingly, preferred embodiments of the invention as set forth herein are intended to be illustrative not limiting. Various changes may be made without departing from the spirit and scope of the invention.

What is claimed is:

1. A method for coupling a head-end to end-users, comprising:

providing a concentrator;

connecting the head-end to the concentrator;

connecting a plurality of mini-fiber-nodes (mFNs) to the concentrator;

connecting the end-users to the mFNs;

receiving a first downstream communication signal from the head-end;

demultiplexing the first downstream communication signal;

transmitting demultiplexed signals to the mFNs based on destination information of each of the demultiplexed signals;

receiving a second downstream communication signal together with the first downstream signal from the head-end, the second downstream communication signal being one of a digital signal or analog signal;

demultiplexing the first and the second downstream communication signals into one or more demultiplexed signals;

modulating a portion of the demultiplexed signals destined to one or more fiber nodes onto radio frequency carriers if the second downstream communication signal is digital; and transmitting one or more modulated signals to the fiber nodes.

2. The method of claim 1, wherein the first downstream communication signal is a multiplexed signal using time domain multiplexing.

3. The method of claim 1, further comprising:

splitting the first and the second downstream communication signals into an analog signal and a digital signal if the second downstream communication signal is analog;

frequency shifting the analog signal to a target frequency band; and transmitting the frequency shifted signal to the fiber nodes.

4. The method of claim 3, further comprising:

demultiplexing the digital signal into one or more signals destined to end-users; and transmitting the signals to respective ones of the mFNs based on destinations of the signals.

5. The method of claim 1, wherein a connection between the concentrator and each of the mFNs is a single fiber supporting full duplex channels.

6. The method of claim 5, wherein the full duplex channels support transmission at about 10 MBPS.

7. A method for coupling a head-end to end-users, comprising:

providing a concentrator;

connecting the head-end to the concentrator;

connecting a plurality of mini-fiber-nodes (mFNs) to the concentrator;

connecting the end-users to the mFNs;

receiving a first upstream communication signal from one or more fiber nodes;

combining into a combined signal the upstream communication signal with a second upstream communication signal received from the mFNs;

transmitting the combined signal to the head-end;
further comprising one of:
  frequency shifting into a frequency shifted signal the first upstream communication signal to a target frequency and coupling the frequency shifted signal with the second upstream communication signal to form the combined signal, or
  demodulating into a demodulated signal the first upstream communication signal and multiplexing the demodulated signal with the second upstream communication signal to form the combined signal.

8. The method of claim 7, further comprising:
receiving said second upstream communication signal from the mFNs in the concentrator; and
routing, to the mFNs, portions of said second upstream communication signal destined to end-users that are reachable through the mFNs.

9. The method of claim 7, further comprising:
receiving said second upstream communication signal from the mFNs in the concentrator; and
multiplexing portions of said second upstream communication signal for transmission to the head-end.

10. The method of claim 9, wherein the portions of said second upstream communication signal is multiplexed using time domain multiplexing.

11. A method for coupling a head-end to end-users, comprising:
providing a concentrator;
connecting the head-end to the concentrator;
connecting a plurality of mini-fiber-nodes (mFNs) to the concentrator;
connecting the end-users to the mFNs;
receiving a downstream communication signal from the concentrator in a mFN of the mFNs;
modulating into a modulated signal the downstream communication signal; and
sending the modulated signal to an end-user;
receiving a loop-back signal from a loop-back device;
coupling the loop-back signal with the modulated signal to generate an enhanced modulated signal; and
sending the enhanced modulated signal to the end-user.

12. A method for coupling a head-end to end-users, comprising:
providing a concentrator;
connecting the head-end to the concentrator;
connecting a plurality of mini-fiber-nodes (mFNs) to the concentrator;
connecting the end-users to the mFNs;
receiving an upstream signal from one or more mFN end-users coupled to a mFN;
demodulating into a demodulated signal the upstream signal;
sending the demodulated signal to the concentrator;
generating a first loop-back signal by one of splitting the upstream signal into the first loop-back signal and a head-end upstream signal or selecting a portion of the demodulated signal;
generating a second loop-back signal based on the first loop-back signal and a medium access scheme; and
coupling the second loop-back signal with a downstream signal to send to the mFN end-users.

13. A communication system between a head-end and end-users, comprising:
  a concentrator;
  an optic fiber connection between the head-end and the concentrator;
  a plurality of optic fiber connections between a plurality of mini-fiber-nodes (mFNs) and the concentrator; and
  a wired connection between the end-users and the mFNs,
  wherein the concentrator comprises:
    a signal separator; and
    a mFN signal controller coupled to the signal separator, wherein the signal separator receives a first downstream communication signal from the head-end and demultiplexes the first downstream communication signal, the mFN signal controller transmitting demultiplexed signals to the mFNs based on destination information of each of the demultiplexed signals,
  wherein the signal separator receives a second downstream communication signal together with the first downstream signal from the head-end, the second downstream communication signal being one of a digital signal or analog signal, the signal separator demultiplexing the first and the second downstream communication signals into one or more demultiplexed signals, modulating a portion of the demultiplexed signals destined to one or more fiber nodes onto radio frequency carriers signals if the second downstream communication signal is digital, and transmitting one or more modulated signals to the fiber nodes.

14. The system of claim 13, wherein the first downstream communication signal is a multiplexed signal using time domain multiplexing.

15. The system of claim 13, wherein the mFN signal controller receives one or more first upstream communication signals from the mFNs, and routes to the mFNs portions of the first upstream communication signals destined to end-users that are reachable through the mFNs.

16. The system of claim 13, wherein the mFN signal controller receives one or more first upstream communication signals from the mFNs, and multiplexes portions of the first upstream communication signals for transmission to the head-end.

17. The system of claim 16, wherein the portions of the first upstream communication signals is multiplexed using time domain multiplexing.

18. The system of claim 13, wherein the signal separator splits the first and the second downstream communication signals into an analog signal and a digital signal if the second downstream communication signal is analog, frequency shifts the analog signal to a target frequency band, and transmits the frequency shifted signal to the fiber nodes.

19. The system of claim 18, wherein the mFN signal controller demultiplexes the digital signal into one or more signals destined to end-users, and transmits the signals to respective ones of the mFNs based on destinations of the signals.

20. The system of claim 13, wherein a connection between the concentrator and each of the mFNs is a single fiber supporting full duplex channels.

21. The system of claim 20, wherein the full duplex channels support transmission at about 10 MBPS.

22. A communication system between a head-end and end-users, comprising:
  a concentrator;
  an optic fiber connection between the head-end and the concentrator;
  a plurality of optic fiber connections between a plurality of mini-fiber-nodes (mFNs) and the concentrator; and a wired connection between the end-users and the mFNs,
wherein the concentrator comprises:
  a signal separator; and
  a mFN signal controller coupled to the signal separator, wherein the signal separator receives a first downstream communication signal from the head-end and demultiplexes the first downstream communication signal, the mFN signal controller transmitting demultiplexed signals to the mFNs based on destination information of each of the demultiplexed signals,
wherein the signal separator receives a first upstream communication signal from one or more fiber nodes, combines, into a combined signal, the upstream communication signal with a second upstream communication signal received from the mFNs, and transmits the combined signal to the head-end,
wherein the signal separator one of:
  frequency shifts into a frequency shifted signal the first upstream communication signal to a target frequency and couples the frequency shifted signal with the second upstream communication signal to form the combined signal, or
  demodulates into a demodulated signal the first upstream communication signal and multiplexes the demodulated signal with the second upstream communication signal to form the combined signal.

23. A communication system between a head-end and end-users, comprising:
  a concentrator;
  an optic fiber connection between the head-end and the concentrator;
  a plurality of optic fiber connections between a plurality of mini-fiber-nodes (mFNs) and the concentrator; and
  a wired connection between the end-users and the mFNs,
  wherein the concentrator comprises:
    a signal separator; and
    a mFN signal controller coupled to the signal separator, wherein the signal separator receives a first downstream communication signal from the head-end and demultiplexes the first downstream communication signal, the mFN signal controller transmitting demultiplexed signals to the mFNs based on destination information of each of the demultiplexed signals,
    wherein a mFN comprises:
      a modulator;
      a coupler coupled to the modulator; and
      a diplexer coupled to the coupler, wherein the modulator receives a downstream communication signal from the concentrator, the modulator modulating the downstream communication signal into a modulated signal, and the diplexer sending the modulated signal to an end-user,
      further comprising a loop-back device coupled to the coupler, the coupler receiving a loop-back signal from the loop-back device and coupling the loop-back signal with the modulated signal to generate an enhanced modulated signal, the diplexer sending the enhanced modulated signal to the end-user.

24. A communication system between a head-end and end-users, comprising:
  a concentrator;
  an optic fiber connection between the head-end and the concentrator;
  a plurality of optic fiber connections between a plurality of mini-fiber-nodes (mFNs) and the concentrator; and
  a wired connection between the end-users and the mFNs,
  wherein the concentrator comprises:
    a signal separator; and
    a mFN signal controller coupled to the signal separator, wherein the signal separator receives a first downstream communication signal from the head-end and demultiplexes the first downstream communication signal, the mFN signal controller transmitting demultiplexed signals to the mFNs based on destination information of each of the demultiplexed signals,
    wherein a mFN comprises:
      a modulator;
      a coupler coupled to the modulator; and
      a diplexer coupled to the coupler, wherein the modulator receives a downstream communication signal from the concentrator, the modulator modulating the downstream communication signal into a modulated signal, and the diplexer sending the modulated signal to an end-user,
      further comprising a demodulator coupled to the diplexer, wherein the diplexer receives an upstream signal from one or more mFN end-users, the demodulator demodulating the upstream signal into a demodulated signal and sending the demodulated signal to the concentrator,
      wherein the demodulator generates a first loop-back signal by one of splitting the upstream signal into the first loop-back signal and a head-end upstream signal or selecting a portion of the demodulated signal, the loop-back device generating a second loop-back signal based on the first loop-back signal and a medium access scheme, the coupler generating a coupled signal by coupling the second loop-back signal with a downstream signal, and the diplexer sending the coupled signal to the mFN end-users.

\* \* \* \* \*